Aug. 11, 1970 H. OETIKER 3,523,337

CLAMPING DEVICE

Original Filed Oct. 23, 1965 4 Sheets-Sheet 1

INVENTOR

HANS OETIKER

BY Craig & Antonelli

ATTORNEYS

INVENTOR
HANS OETIKER

BY Craig & Antonelli
ATTORNEYS

CLAMPING DEVICE

Original Filed Oct. 23, 1965

INVENTOR

HANS OETIKER

BY Craig & Antonelli

ATTORNEYS

Aug. 11, 1970 H. OETIKER 3,523,337
CLAMPING DEVICE
Original Filed Oct. 23, 1965 4 Sheets-Sheet 4
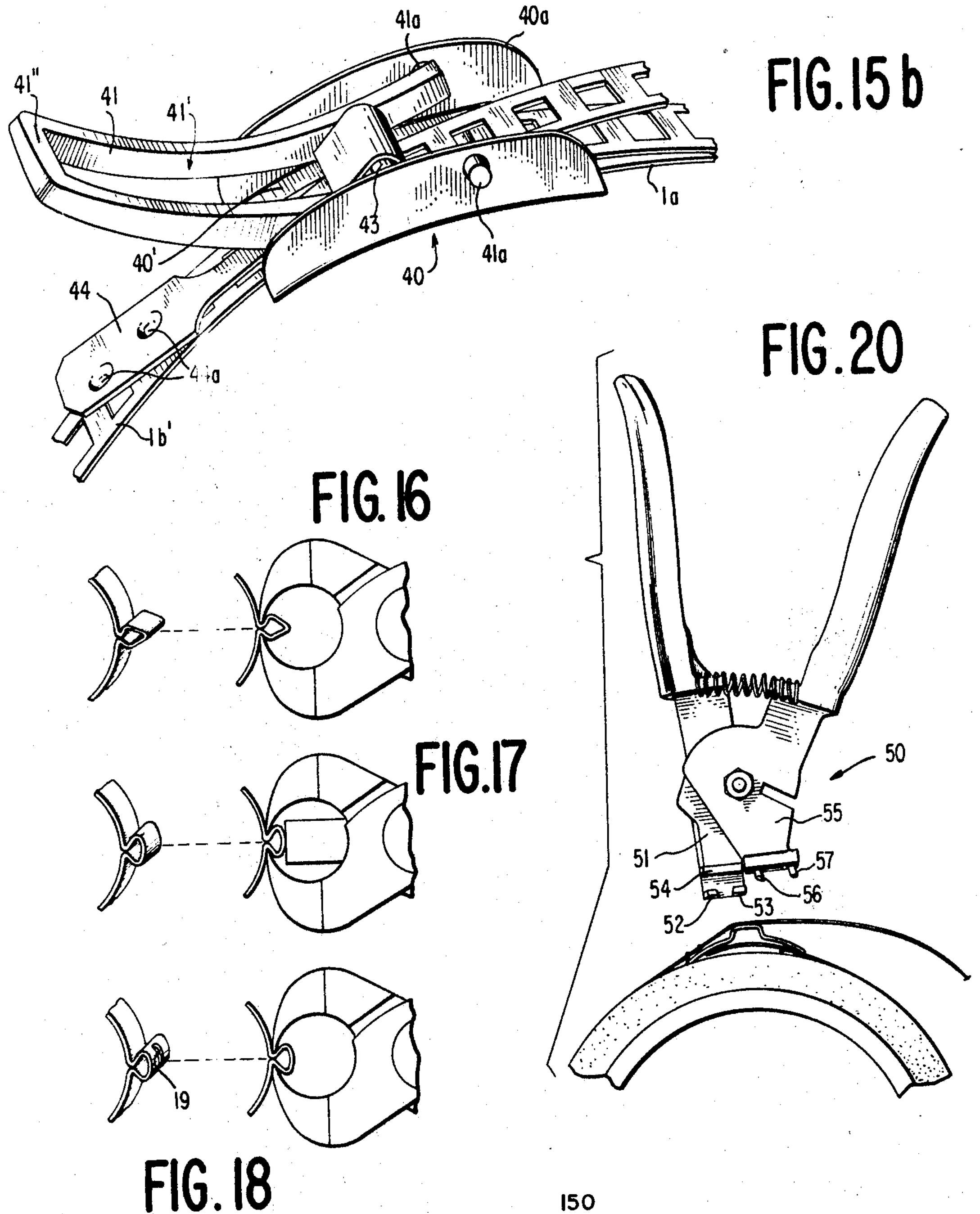
FIG. 15 b, FIG. 16, FIG. 17, FIG. 20
FIG. 18
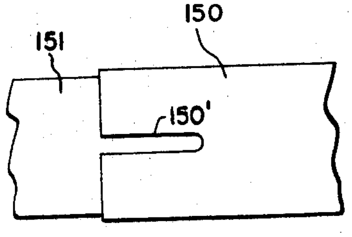
FIG. 19
INVENTOR
HANS OETIKER
BY Craig & Antonelli
ATTORNEYS United States Patent Office 3,523,337
Patented Aug. 11, 1970

3,523,337

CLAMPING DEVICE

Hans Oetiker, 21 Oberdorfstrasse, Postfach 93, Horgen, Switzerland

Original application Oct. 23, 1965, Ser. No. 503,541, now Patent No. 3,475,793, dated Nov. 4, 1969. Divided and this application June 26, 1968, Ser. No. 740,113
Int. Cl. B65d 63/02
U.S. Cl. 24—20 28 Claims

ABSTRACT OF THE DISCLOSURE

A clamp structure for use as a hose clamp or the like which is capable of withstanding relatively high pressures and which is formed by a band and at least one tensional spring element made of a material having a high elastic limit so as to preserve the clamping pressure which might otherwise lessen due to aging, etc.; several tensional spring elements may also be provided which are distributed over the circumference of the band. The tensional spring elements may be in the form of undulated springs or may be in the form of ear-shaped folds having radially outwardly projecting band portions which pass over into the circumferentially extending band portions through arcuate portions. The ends of the band are provided with a closing mechanism permitting a preliminary step-wise fitting of the band to the diametric dimensions of the hose or other object to be clamped.

The present application is a divisional application of my parent application Ser. No. 503,541, entitled "Clamping Device" and filed in the U.S. Patent Office on Oct. 23. 1965 and now Pat. No. 3,475,793 issued Nov. 4, 1969.

The present invention relates to an automatically readjusting and retightening clamp for clamping especially a hose on a nipple by means of a band which is either adapted to be closed or which is endless.

For many purposes of the machine construction and manufacture of apparatus in which gases or liquids flow through partially flexible lines, the installation of hose pieces is necessary between the pipe connections. In many cases it is desirable to clamp together the hose and nipple at the end of a pipe line in a simple manner. For purposes of servicing, repairs, or cleaning of such lines, it is also desirable to be able to disconnect again the normally clamped-on hose without, of course, damaging the same. Also, it is obviously desirable to be able to re-use the hose clamp. In the automobile industry, for example, short flexible hose pieces are inserted into pipe connections which conduct air and liquids. Also, it is customary in the automotive industry to cover drive shafts by means of flexible, bellows-like hose pieces in order to protect the same against soiling. These hose pieces have to be disconnected for purposes of repairs and/or servicing.

The present invention is predicated on the concept of maintaining the pressing-on action of a hose on a nipple by means of a continuously existing permanent springy or elastic force effect in the clamp. With a loosening of the hose as a result of aging and yielding of the material, which occurs in all cases, the clamping pressure is to be preserved according to the present invention by the permanent elastic pressure effect.

The present invention essentially consists in that the band is provided with at least one or several, distributed tensional spring elements.

The clamp may thereby have an open annular shape so that it can be installed over the hose without difficulty at any place without having to be slipped over the hose from one end of the line. However, the clamp in accordance with the present invention may also be closed or endless. In most cases, the clamp of the present invention will have an annular shape. However, it may also have the shape of a polygon, for example, that of a square, or a rectangle. Appropriately, each side is then provided with a tensional spring element.

Accordingly, it is an object of the present invention to provide a retightening and self-adjusting clamp, especially hose clamp which is simple in construction and easy to manufacture and install, yet does not involve undue expenditures.

It is another object of the present invention to provide a self-adjusting hose clamp which can be readily installed, yet maintains a spring action even in case of aging of the hose material.

A further object of the present invention resides in a self-adjusting clamp of the type described above which overcomes the shortcomings encountered heretofore with the prior art constructions.

Still another object of the present invention resides in the provision of a hose clamp which is so constructed and arranged as to be capable of maintaining a springy force effect that is preserved for very long periods of time.

Another object of the present invention resides in the provision of an automatically adjusting hose clamp which maintains, at all times, a good pressure effect and spring action irrespective of changes in the pressure within the line, changes in the ambient temperature in the fluid conducted through the line or changes in the hose material due to aging.

These and further objects, features, and advantages of the present invention will become more obvious from the following description when taken in connection with the accompanying drawing which shows, for purposes of illustration only, several embodiments in accordance with the present invention, and wherein.

Figure 11:
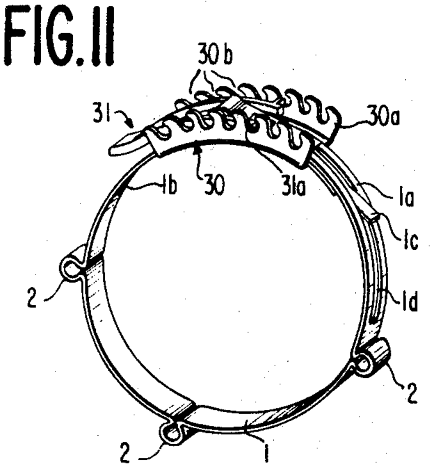
FIG. 11 is a perspective view of a still further modified embodiment of an open clamp in accordance with the present invention having a novel clamping mechanism.
Figure 12:
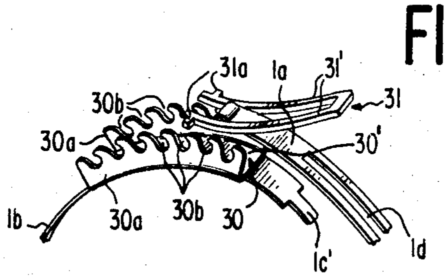
Figure 12A:
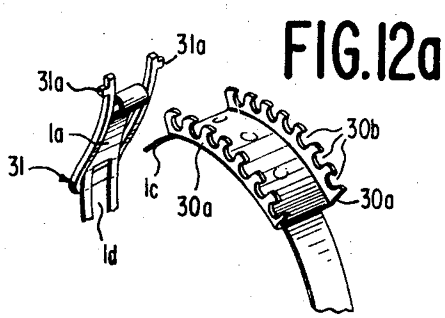
Figure 13:
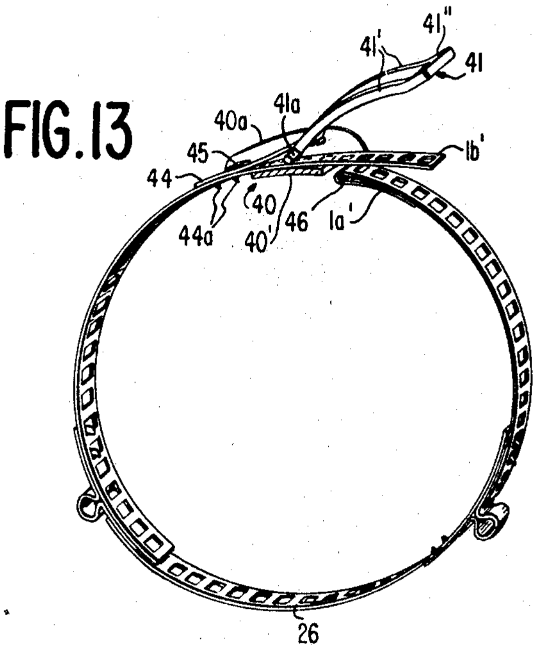
Figure 14:
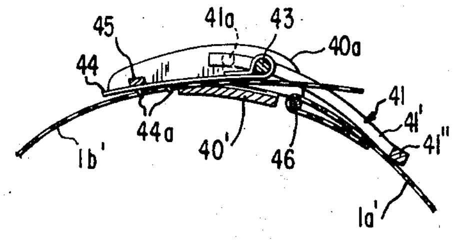
Figures 15, 15A:
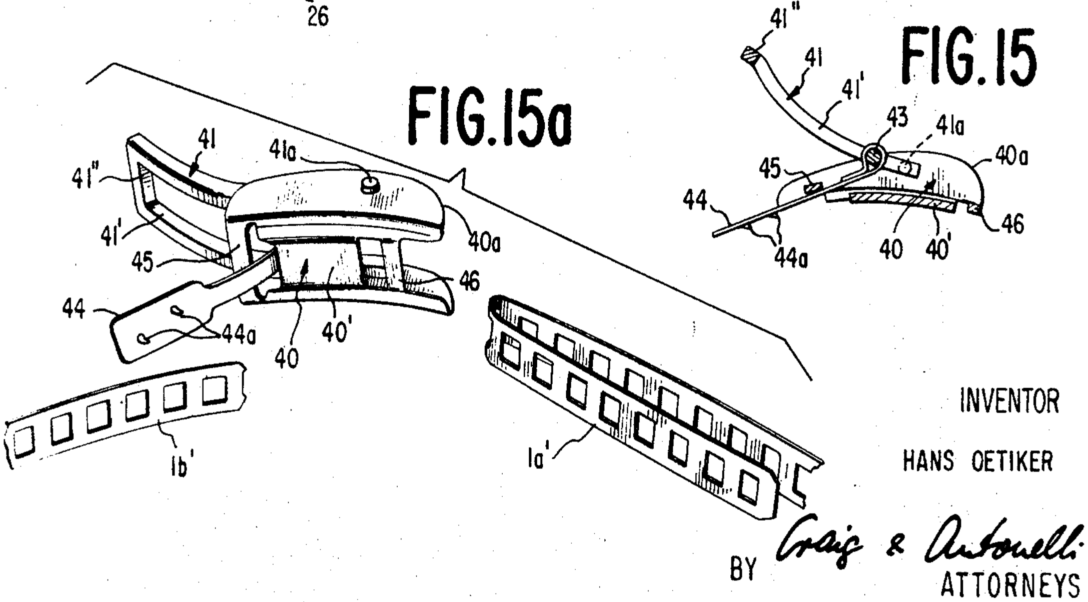

FIGS. 12 and 12*a* are partial perspective views, similar to FIG. 11 and illustrating the clamp of FIG. 11 prior to inserting the clamping lever of the clamping mechanism thereof;

FIG. 13 is a perspective view of a further modified embodiment of a clamp in accordance with the present invention utilizing a ladder-type band;

FIGS. 14 and 15 are partial cross-sectional and elevational views, respectively, illustrating the operation of the step-by-step clamping mechanism used with the clamp of FIG. 13;

FIGS. 15*a* and 15*b* are perspective views on a somewhat larger scale and illustrating the details of the closure mechanism of the clamp of FIGS. 14 and 15;

FIG. 16 is a partial perspective view on a hose clamp of the prior art which, when closing the lug or ear with ordinary pincers, fails to produce the desired shape for the ear or lug during contraction by means of conventional pincers;

FIG. 17 is a partial perspective view, similar to FIG. 16, and illustrating a special tool to assure the proper shaping of the fold or lug when contracting the clamp by applying the pincers;

FIG. 18 is a partial perspective view, similar to FIGS. 16 and 17 and illustrating a clamp in accordance with the present invention provided with a reinforcement obviating the shortcomings encountered with the constructions of FIGS. 16 and 17;

FIG. 19 is a schematic elevational view illustrating a pipe connection by means of a clamp in accordance with the present invention; and FIG. 20 is an elevational view of a special tool for use with the clamps according to the present invention.

Figures 1, 2, 4:
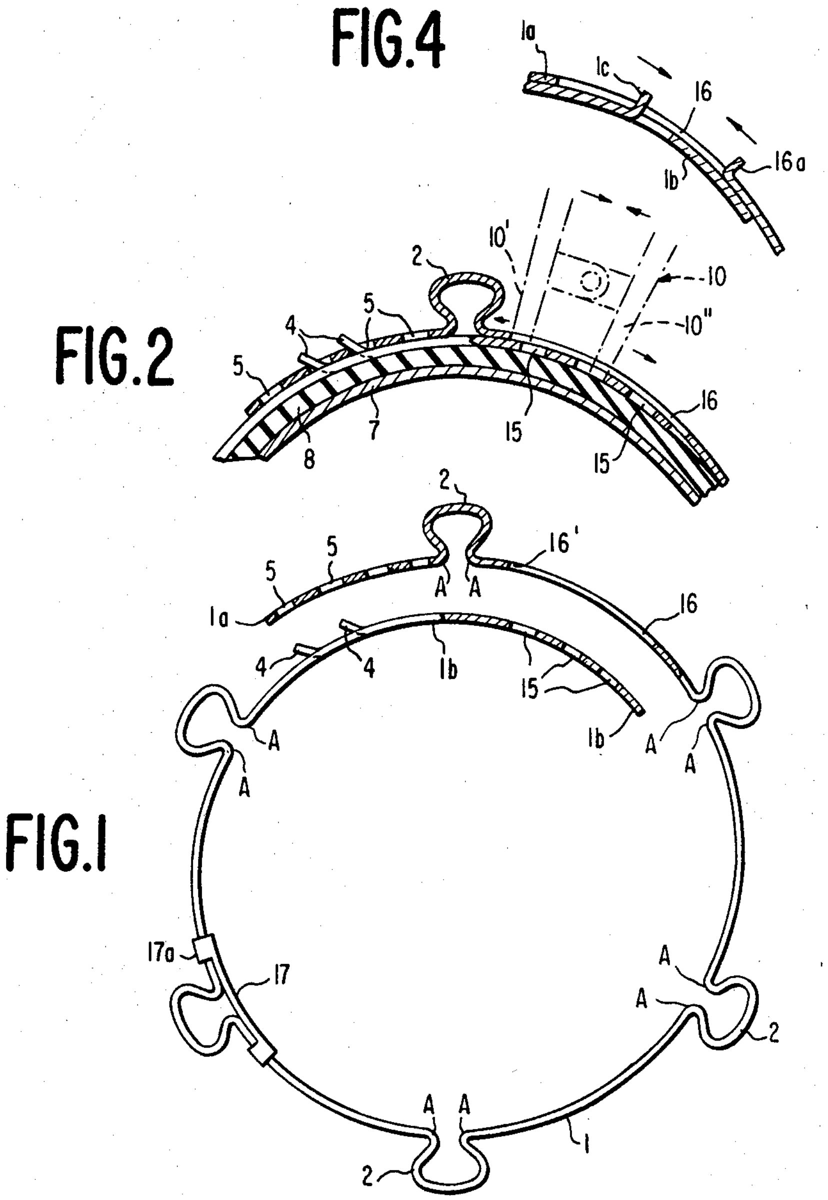
FIG. 1 is an elevational view, partly in cross section, of a first embodiment of an open clamp in accordance with the present invention.
FIG. 2 is a partial cross-sectional view, similar to FIG. 1, and illustrating the clamp thereof in the closed condition when installed on the hose.
FIG. 4 is a partial cross-sectional ivew, similar to FIG. 2, and illustrating a clamp in accordance with the present invention having a modified clamping means.

Referring now to the drawing wherein like reference numerals are used throughout the various views to designate like parts, and more particularly to FIG. 1, this figure illustrates one embodiment of a clamp in accordance with the present invention. The clamp of FIG. 1 consists of an open, substantially annularly shaped band 1. The band 1 is provided with several tension spring elements along the circumference of the hose to be secured. The tension spring element consists of ear-shaped, bent-out lugs or folds 2. These folds or lugs 2 in the form of bent-out portions and provided in the band 1 itself in their final shape, form the tension spring element, properly speaking, of the hose clamp. Each fold or lug 2 which may have approximately the shape of an Ω, is provided with outwardly extending band portions passing over into the circumferential band portions by way of arcuate portions so as to minimize the stresses within the transitional areas and therewith the danger of failures. The size of the tension spring elements 2 is so chosen that the places A—A at the transitions from the band 1 to the lugs 2 can carry out considerable changes in the spacing without causing a permanent elongation or extension. A highly elastic, flexible band material is used for the clamp of FIG. 1. This material has to be capable of being elastically deformed and bent to a high degree without causing any permanent deformations. The elastic limit must be high, in contrast to soft steel as is normally used for hose clamps which have similar folds or lugs but which are pressed together or contracted permanently into an annular shape by means of pincers, i.e., are plastically deformed. A suitable material for the clamp according to the present invention is a heat-treated, tough but not brittle spring steel. Additionally, the following materials are also suitable for the present invention though the same is not limited thereto as long as the materials have similar characteristics: bands of chrome-nickel steel, bronze bands, synthetic plastic materials, aluminum alloys, etc.

The ring-shaped band 1 is provided at the end **1*a* thereof with perforation apertures 5. Counterhooks 4 are provided at the other end 1*b* of the band 1. During the annular contraction of the band 1, the hooks 4 can engage into the perforation apertures 5**.

Figure 3:
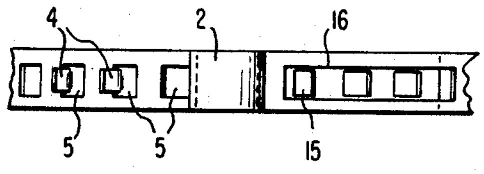
FIG. 3 is a partial plan view on the clamp of FIGS. 1 and 2 in the closed and clamped-on condition thereof.

The hose clamp of FIG. 1 is assembled and installed in the following manner:

After slipping the hose end over the nipple 7 and placing the band 1 about the hose 8, the ends of band 1 are drawn together. The hose clamp extends elastically by reason of the ear-shaped lugs 2 which are adapted to yield elastically and are effective as tension spring elements. The hose clamp is pressed thereby into the surface of the hose 8 and thus the hose 8 is elastically pressed onto the nipple 7. The places of interruption A—A are thereby drawn apart. In order to avoid a swelling or bulging out of the hose material at these places, sheet metal bridging elements 17 may be placed underneath the gap formed at the places A—A between the hose 8 and the band 1. Perforation apertures 15 are provided at the lower end **1*b* of the band 1 for purposes of contracting the same. An elongated slot 16 is provided within the abutment area of the other band end 1*a* disposed above the band end 1*b* and within the area of the perforation apertures 15. With the band 1 emplaced over the hose 8, the perforation apertures 15 appear in the aperture of the elongated slot 16, as illustrated in FIG. 3. By means of a plier-like tool 10, indicated in FIG. 2 in dash lines, the contraction of the clamp on the hose can take place in the direction of the arrows shown in FIG. 2 by engaging the leg 10′ against the end wall 16′ of slot 16 (FIG. 1) and by engaging the leg 10″ against the oppositely directed wall of a respective aperture 15, and thereafter actuating the pliers to move the legs 10′ and 10″** in the directions indicated by the arrows.

Thus, the tool 10 is applied, on the one hand, in a perforation aperture 15 of the lower band end **1*b* with leg 10″ and, on the other, against the end 16′ of the elongated slot 16 of the upper band end 1*a* with leg 10′ or directly laterally at the adjacent lug 2. The gripping of the band 1 is facilitated if the work tool 10 is constructed of hook-shape at the pressure edges of the legs 10′ and 10″. It is of advantage during assembly to undertake the application of the work tool 10 with its leg 10′ against the lug or ear 2. In contradistinction thereto, for disassembly, the work tool 10 is applied appropriate at the end 16′ of the upper slot 16**.

A further possibility for contracting the clamp is illustrated in FIG. 4. The upper band end **1*a* provided with the slot 16 has a bent-over projection or hook-like portion 16*a*. The band end 1*b* disposed therebelow is also provided with a bent-over, hook-like portion 1*c* in lieu of the perforations 15 of FIG. 1. The bent-over projection 1*c* extends through the slot 16. The hose clamp can be tightly installed by simply pulling together the bent-over, hook-like portions 16*a* and 1*c* until hooks 4 engage in the proper apertures 5** to produce the desired or required clamping pressure.

The disassembly of the clamp for the removal of the hose can take place in a simple manner in that the two ends are contracted slightly by pulling together hook-like projections **1*c* and 16*a*. As a result thereof, the hooks 4 become loose in and again disengage from the perforation apertures 5 or 15**, and the clamp can be removed.

Figure 6:
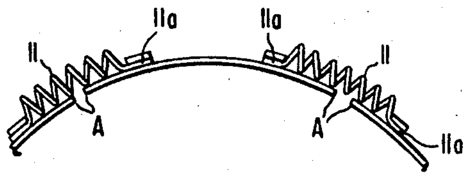
FIG. 6 is a somewhat schematic partial elevational view, illustrating a still further modified embodiment of a clamp in accordance with the present invention provided with additional spring elements.

A coil spring may also be used as a tension spring element. The ring-shaped band is then sub-divided into segments at the places A—A. Short coil springs 11 which are secured at the segments, for example, by welding, soldering, or hooked engagements (**11*a***), serve for the connection of segment-to-segment (FIG. 6).

Figure 5:
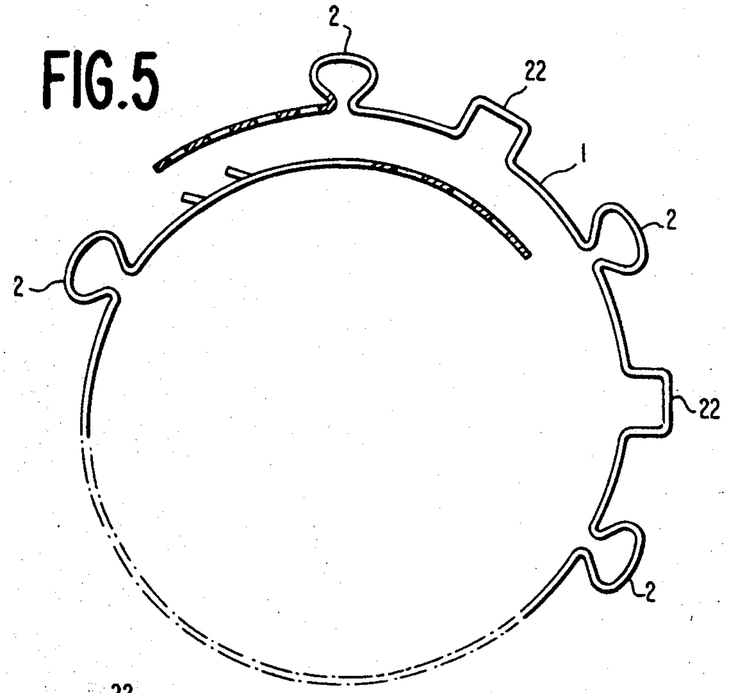
FIG. 5 is an elevational view, partly in cross section and similar to FIG. 1, of a modified embodiment of a clamp in accordance with the present invention, provided with additional ears or lugs.

The band 1 of the clamp according to FIG. 5 may be provided, in addition to the elastically effective tension spring elements 2, with additional ear-shaped lugs or folds 22 which, however, are not elastic but instead deformable. The band material has to have within the area of these lugs or folds 22 a deformable structure. This is in contrast to the band places with the tension spring elements 2 where the elasticity has to be preserved. The additional ear-shaped lugs or folds 22 can then be contracted in a known manner by means of pincers or the like. A carbon steel may be used as band material for the lugs or folds which is initially hardened after receiving the basic configuration according to FIG. 5 and thereby receives high elasticity properties; the additional folds or lugs 22 are thereafter annealed so that the band material becomes soft in those places, i.e., receives a deformable structure. The additional lugs or folds 22 may be used both with an open as well as with a closed clamp.

The sub-division into deformable and elastic folds or lugs could be avoided if a material is used that exhibits even after realized deformation still a sufficient elasticity which permits a sufficient spring action, for example, carbon steel, stainless steel, etc.

In order to prevent a bulging or squeezing out of the hose material at the interruption places A—A, sheet metal bridging elements 17 may be also underlaid, whereby the bridging elements 17 are appropriately provided at the edge thereof with short, bent-over portions 17*a* (FIG. 1) in order to prevent any unintentional disengagement or sliding off. In lieu of the bridging elements 17, bridging tongues or straps may be formed in the band itself in the form of narrow, U-shaped, punched-out portions which are bent-over into the gap A—A. The lower end of the band may also be provided with a tapering tongue portion which extends in the installed condition of the hose clamp into the slot 16 of the other end of the band. A guidance and a gradual transition of the pressing-on band parts on the surface of the hose results from such an arrangement. A wear for instance by abrasion, of the hose material is avoided thereby.

Figures 7, 9, 10:
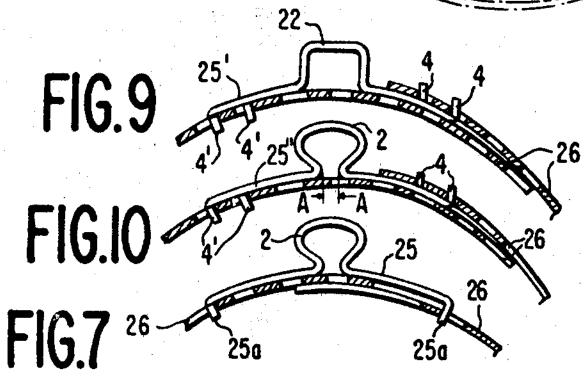
FIG. 7 is a partial cross-sectional view, illustrating another modified embodiment of a clamp in accordance with the present invention provided with claws.
FIG. 9 is a partial cross-sectional view, illustrating still a further modified embodiment of the clamp in accordance with the present invention having a different claw construction.
FIG. 10 is a partial cross-sectional view, similar to FIG. 9 but of modified construction of the claws thereof.

FIG. 7 illustrates a tension spring element 2 on a short band piece 25 which is provided at the ends thereof with claws 25*a* and which is used in conjunction with a perforated ladder-type band 26. The band 26 is placed about the hose to be fastened whereby the ends of band 26 slightly overlap, thereafter the band is contracted. After emplacement of the band piece 25 and hooking engagement of the claws 25*a* in the perforation apertures of band 26 at the place of overlap, a hose clamp is realized which now remains permanently under an elastic tension. This band piece 25 can also be provided with a contractable lug or fold 22 of the type illustrated in FIG. 5.

Figure 8:
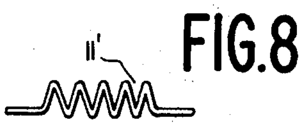
FIG. 8 is an elevational view of a band-type spring element for use with a clamp in accordance with the present invention.

An undulated band spring 11' according to FIG. 8 may also be used as a tension spring element.

FIGS. 9 and 10 illustrate short band pieces 25' and 25" with counter-hooks 4 and 4' provided at the ends thereof on the upper and bottom side, respectively, which are hooked into the apertures of the overlapping ends of the perforated band 26. As a result thereof in the embodiment of FIG. 9, the lower band end is not impaired or obstructed by the upper band during contraction. In the embodiment of FIG. 10, a wear of the hose material, for instance, by abrasion of the like, between the places A—A is effectively prevented which is also the case in FIG. 9 since the overlapping end of the lower band bridges the gap A—A of the fold or lug 2 or 22.

FIGS. 11, 12 and12*a* illustrate a modified embodiment of a hose clamp in accordance with the present invention having several ear-shaped lugs or folds 2 as tension spring elements, as illustrated in FIGS. 2 and 5. The clamp of this embodiment comprises a relatively fixed part generally designated by reference numeral 30 made, for instance, of sheet metal. The part 30 is suitably secured in any conventional manner, for example, by riveting, welding, etc. to the lower end 1*b* of the band 1. Preferably, the part 30 is provided with two slots in the base portion 30' thereof so that the band 1 can be inserted from below through the first slot to extend above the base portion 30' to the second slot where the free end of the band re-enters the area disposed below the base portion 30'. The part 30 is thereby secured to the lower band end 1*b* at a slight distance from the end thereof so as to permit accommodation of the tongue portion 1*c'* for engagement into the slot 1*b* provided near the upper band end 1*a*, thus providing a certain guidance as pointed out above. The relatively fixed part 30 of the snap-type closure mechanism includes the base portion 30' and two side portions 30*a* bent at right angle to the base portion 30'. The base portion 30' is thereby substantially straight as viewed in an axial cross-sectional view but is curved in elevation, as viewed in the axial direction of the clamp, with the curvature corresponding approximately to the expected curvature of the band, as a result of such shape of the part 30, it rests in the assembled condition of the hose clamp substantially flush on the portion of the lower band end 1*b* on which it is mounted. The side portions 30*a* are provided with a plurality of apertures 30*b*, appropriately aligned in the two lateral portions and of appropriate configuration to prevent unintentional opening of the closure mechanism. Though the presence of the several ears or folds 2 which can be elastically bent in a spring-like manner provide use of the clamp for hoses with somewhat different diameters, the several apertures 30*b* enable use of the clamp with a considerably wider range of different hose diameters. The clamping lever generally designated by reference numeral 31 is of U shape as viewed in a plan view with the leg portions 31' of the U being again curved similarly to the curvature of the stationary part 30 as viewed in elevation so that the U-shaped part constituting also the actuating handle portion is substantially flush with the circumference of the hose clamp when the closure mechanism is closed. The clamping lever 31 is thereby suitably secured to the upper band end 1*a*, for example, by fastening the latter about a web portion provided near the open end of the U and joining the two leg portions 31'. The clamping lever 31 is additionally provided with lateral outwardly extending projections 31*a* which are adapted to be inserted into the appropriate apertures 30*b* of the lateral portions 30*a* and constitute the pivot points for the joints when the clamping lever 31 is rotated from the position illustrated in FIG. 12 into the position illustrated in FIG. 11 to close and lock the closure mechanism. As mentioned above, the shape of apertures 30*b* is such as to prevent inadvertent opening of the closure mechanism which can be had normally by pivoting the clamping lever 31 back in the opposite direction from the position of FIG. 11 to the position of FIG. 12.

FIG. 12 illustrates the clamping element alone shortly before the insertion of the clamping lever 31 into one set of the apertures 30*b* while FIG. 11 shows the clamping lever 31 after the latter has been inserted into the desired apertures 30*b* and has been brought into the clamping position thereof. The clamping lever 31 thus inserted into a set of apertures 30*b* and snapped over to its closing position is illustrated in FIG. 11. As a result of such closure of the snap-type clamping mechanism 30, 31, the band end 1*a* is brought into the automatically re-adjusting and re-tightening clamping position thereof with simultaneous elastic stressing of the tension spring elements 2. Consequently, the band 1 radially compresses the hose disposed therebelow with a uniform pressure distribution. The insertion of the projections 31*a* in a respective one of the distributed apertures 30*b* takes place depending on the hose diameter.

As mentioned above, the band end 1*b* is provided with a tongue portion 1*c* which extends into the elongated aperture 1*d* of the other band end 1*a*. As a result thereof, the two band ends are mutually guided and at the same time there is achieved a mutual and gradual transition of the pressure forces from one band end to the other band. Corresponding tongue portions and apertures may also be used to advantage with the smooth band constructions according to FIGS. 1 and 5.

The installation and coupling of the clamp as well as the stressing of the tension spring elements may also take place with the use of a perforated band by means of a snap-tight closure mechanism according to FIGS. 13, 14, 15, 15*a* and 15*b*. The band ends 1*a'* and 1*b'* again overlap in this embodiment. A bent sheet-metal piece generally designated by reference numeral 40, which forms the relatively fixed part and is approximately matched to the diameter of the given hose, is provided with a base portion 40′ and bent side portions 40*a* bent at right angle to the base portion 40′. The U-shaped snap-tight lever generally designated by reference numeral 41 includes leg portions 41′ connected by a web portion 41″ which forms the manually actuatable handle portion of lever 41. The latter is inserted into and pivotally supported in the side portions 40*a* by means of the outwardly projecting pin-like elements 41*a* while a sheet metal piece 44 is pivotally secured about the intermediate web portion 43 on the lever (FIGS. 14 and 15). The sheet-metal element 44 is again provided with downwardly extending counterhooks 44*a* near the free end thereof. The sheet-metal piece 44 which is of sufficiently strong construction so as to be relatively stiff is so guided by a web portion 45 arranged above the same at the lateral wall portions 40*a* that the perforated band end 1*b*, corresponding to FIG. 1, is seized and gripped in the perforation apertures thereof by the counterhooks 44*a*. The other band end 1*a* is secured about the further web portion 46 on the fixed piece 40 by being folded about the same.

If the snap-type lever 41 is now displaced from the left position thereof illustrated in FIG. 15, to the right position thereof, illustrated in FIG. 14, then a tightening takes place of the band 26 placed about the hose and therewith a stressing of the distributed tension spring elements 2. The web portion 45 effects a constant abutment of the counterhooks 44*a* provided on the sheet metal strip 44 against the perforated band 26.

By a to and fro movement of the snap lever 41 and simultaneous pressing of the band end 1*b*′ projecting on the right side to hold the same, the band can be tightened in a step-wise manner. The tightening or clamping operation is terminated when the tension spring elements 22 have expanded somewhat, i.e., when the distances A—A (in FIG. 1) have become somewhat greater. This clamping action now remains preserved practically in its full strength. This is also the case when the hose, for example, as a result of aging, yields in its diameter or in its wall thickness. Non-springy or non-elastic hose clamps would, in this case, become loose since an automatic readjustment and retightening does not take place with the same. FIG. 13 illustrates such a snap-type closure mechanism on a perforated band with tension spring elements according to FIG. 10.

The combination of deformable folds or lugs 22 in conjunction with the springy or elastic folds and lugs 2 according to FIG. 5 necessitates that the deformable lugs or folds must have a relatively large contracting path. The contraction must make possible both the circumferential shortening as a result of the compression of the hose as well as also the elastic expansion of the tension spring elements. The increased deformability of the lugs or folds 22 required in connection therewith is generally realized with band thicknesses of 1.2–2.5 mm. and the folds or ears can still be contracted into an annular shape. With weaker band material below about 1 mm. there exists the danger that a sharp bending, i.e., buckling or collapse, takes place in the center of the fold as illustrated in FIG. 16. The parts adjacent the sharp bend or buckling no longer participate in the deformation whereby the deformability is reduced from an over-all point of view. In order to counteract this undesired sharp bending in the center of the ear or fold, special tools or pincers were used as shown in FIG. 17 which are provided in the center with an abutment that prevents the formation of sharp bends and of an increase in height of the contracted fold or ear. However, the use of a special tool is oftentimes undesirable or even impossible. According to FIG. 18, the sharp bending or buckling can be avoided by a reinforcement 19 of the center portion of the fold or lug. The reinforcement can take place by means of a small groove, indentation, depression, notch or recess 19 in the central part of the fold or lug which extends in the direction of the band. The stretching and stress work thereby occurs in the desired type of deformation. The rim portions of the fold or lug are used to an increased extent for the bending work which entails altogether an increase in the useful bending work (force path).

The grooving, indenting, depressing, notching, or recessing can, of course, also be used with the elastic folds, for example, with the folds 2 in FIG. 2 and in FIG. 5 as well as with the folds in FIGS. 7, 9 and 10. The clamping force is thereby increased to utilize thinner, and thereby also more flexible material which is more capable to adapt itself to the contours of the hose.

Additionally, by the use of such reinforcements 19, it may be possible to dispense with any aftertreatment of the elastic steel band within the areas of the folds or ears 22, as mentioned above, by appropriately selecting the band material so that the same band material can be used for the folds or ears 2 as well as the folds or ears 22. For example, it would be possible to choose a band material having such hardness that an increase in the elasticity with the prefabricated ears or lugs 2 as well as a corresponding reinforcement with the ear or lug 22, to be closed subsequently, can be achieved by means of notches, grooves, indentations, or depressions 19 described above. In other words, the need for annealing the material within the area of the folds or lugs 22 might be obviated thereby.

The clamps according to the present invention may also be used for clamping together pipes. FIG. 19 illustrates two pipes 150 and 151, one placed within the other, whereby the end of the outer pipe 150 is provided with a longitudinal slot 150′. This end thereby receives a certain radial yieldingness and can be clamped by means of a clamp in accordance with the present invention onto the inner pipe 151. The automatically re-adjusting and retightening properties of the clamp in accordance with the present invention makes it possible to keep pipes, which are exposed to strong heat expansions, under a constant uniform elastic pressure seal.

FIG. 20 illustrates a special pincer-type tool which may bee used for installing a clamp of the type illustrated in FIG. 10. The tool generally designated by reference numeral 50 comprises a first leg portion 51 provided with two angularly bent projections 52 and 53 adapted to engage into and directly adjacent the fold. A further projection 54 serves as a guide for the band end. The other leg portion 55, pivotally secured to the leg portion 51 is provided with two claw-like projections 56 and 57 adapted to engage in the perforations of the band. As the two handle portions of the pincers are pulled together, the leg portions 51 and 55 are spread apart, thereby pulling the band end tighter around the hose with the hooks 4 constantly engaging in appropriate perforations or apertures.

While I have shown and described several embodiments in accordance with the present invention, it is understood that the same is not limited thereto but is susceptible of numerous changes and modifications as known to a person skilled in the art. For example, in lieu of several coil springs 11 as shown in FIG. 6, one or several coil springs may be used of greater length extending over the corresponding portion of the circumference of the hose, which coil spring or springs can be stressed over the hose circumference by a snap-type closure mechanism of the type illustrated in FIGS. 13, 14, 15, 15*a* and 15*b*. Similarly, the clamp 30, 31 of FIGS. 11, 12 and 12*a* may also be used to clamp together the ends of a clamp structure utilizing the undulated band spring 11′ of FIG. 8.

I claim:

1. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamped including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintain the desired clamping pressure, said closure means including a relatively fixed base portion having first means operable to engage with one end of the band, lever means with second means operable to selectively engage with aperture means in the other end of the band, and third means on said portion to enable pivotal closing and opening movements of said lever means.

2. A clamp structure according to claim 1, wherein several distributed tensional spring means are provided.

3. A clamp structure according to claim 2, wherein at least some of the tensional spring means are integral with the band and the band has an elastic structure at least at the places of said spring means.

4. A clamp structure according to claim 3, wherein all of said tensional spring means are integral with the band.

5. A clamp structure according to claim 3, further comprising ear-shaped fold means in addition to said tensional spring means, said ear-shaped fold means having a deformable structure.

6. A clamp structure according to claim 5, wherein several tensional spring and fold means are provided which are arranged in alterntae relationship along the band.

7. A clamp structure according to claim 1, further comprising ear-shaped fold means in addition to said tensional spring means, said ear-shaped fold means having a deformable structure.

8. A clamp structure according to claim 7, wherein several tensional spring and fold means are provided which are arranged in alternate relationship along the band.

9. A clamp structure according to claim 7, wherein the transition from the outwardly extending portions of the fold means to the adjacent circumferentially extending portions are of arcuate shape to minimize stresses.

10. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamping including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintains the desired clamping pressure, several distributed tensional spring means being provided, at least some of the tensional spring means being integral with the band and the band having an elastic structure at least at the places of said spring means, ear-shaped fold means in addition to said tensional spring means, said ear-shaped fold means having a deformable structure, several tensional spring and fold means being provided which are arranged in alternate relationship along the band, and each ear-shaped fold means possessing initially a generally U-shaped configuration with outwardly extending leg portions joined by a web portion.

11. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamped including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintains the desired clamping pressure, and at least one initially generally U-shaped band tension adjustment means having portions thereof which are permanently deformable to form ear-shaped fold means, said fold means being in addition to said tensional spring means.

12. A clamp structure according to claim 11, wherein a plurality of said fold means are provided which are arranged along the band in alternate relationship with said tensional spring means.

13. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamped including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintains the desired clamping pressure, said band being provided with perforation aperture means at least at both ends, and said closure means being an element separate from said band and being provided with at least one of said tensional spring means and at the ends thereof with claw means which engage into the perforation aperture means of the band when the latter is placed about the hose and has been tightened.

14. A clamp structure according to claim 13, wherein said band is additionally provided with contractable ear-shaped fold means.

15. A clamp structure according to claim 13, wherein said fold means are provided with notched reinforcing means extending in the direction of the band.

16. A clamp structure according to claim 15, wherein said band is additionally provided with contractable ear-shaped fold means.

17. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamped including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintains the desired clamping pressure, said band being provided with perforation aperture means, and said closure means including a short band piece provided with said tensional spring means, and hook means for engagement with said aperture means.

18. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamped including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintains the desired clamping pressure, said closure means including a relatively fixed, curved base member having substantially rectangular outwardly bent side portions, snap-type lever means pivotally connected to said base member and including sheet metal strip means pivotally connected thereto, said strip means being provided with counter-hook means, and web means for pressing the counter-hook means against the perforated band to thereby laterally guide the band end above said curved sheet metal member.

19. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamped including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintains the desired clamping pressure, and ear-shaped fold means in addition to said tensional spring means, said ear-shaped fold means having a deformable structure, and each ear-shaped fold means possessing initially a generally U-shaped configuration with outwardly extending leg portions joined by a web portion.

20. A clamp structure according to claim 19, wherein all of said fold means are provided with notched reinforcing means extending in the direction of the band.

21. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamped including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintains the desired clamping pressure, and ear-shaped fold means in addition to said tensional spring means, said ear-shaped fold means having a deformable structure, at least some of said fold means being provided with notched reinforcing means extending in the direction of the band.

22. A clamp structure according to claim 21, wherein a plurality of said fold means are provided which are arranged along the band in alternate relationship with said tensional spring means.

23. A clamp structure according to claim 21, wherein all of said fold means are provided with notched reinforcing means extending in the circumferential direction of the band.

24. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamped including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintains the desired clamping pressure, said closure means including a relatively fixed base portion having first means operable to engage with one end of the band, lever means with second means operable to engage with the other end of the band, and third means on said portion to enable pivotal closing and opening movements of said lever means, said third means being formed by upwardly extending side portions of the base portion provided with aperture means into which are adapted to be inserted lateral pin-like projecting portions of the lever means, said aperture means being of such configuration as to preclude disengagement of the pin-like portions with the lever means pivoted into clamping position.

25. A clamp structure according to claim 24, wherein said base portion is provided with two slots spaced from one another through which the one end of the band is extended, the other end of said band being secured about a web portion in the lever means.

26. A clamp structure according to claim 25, wherein said one band end is provided with a tongue portion adapted to engage in a slot provided in the other band end for the mutual guidance thereof.

27. A clamp structure capable of withstanding high pressures for securely clamping together objects, especially for clamping hoses on a nipple which is formed at least in part by an open band, wherein the improvement comprises means providing a preliminary step-wise fitting of the band to the circumferential dimensions of the object to be clamped including closure means separate from the band for closing the open ends of the band by engagement in aperture means provided in at least one band end, and at least one tensional spring means in the clamp structure which possesses a permanent elastic force effect capable of automatic readjustment to compensate for loss in clamping pressure due to aging and thereby maintains the desired clamping pressure, said closure means including a relatively fixed base portion having first means operable to engage with one end of the band, lever means with second means operable to engage with the other end of the band, and third means on said portion to enable pivotal closing and opening movements of said lever means, said second means being formed by a portion pivotally connected with the lever means and provided with hook means for the engagement in corresponding aperture means of the one band end.

28. A clamp structure according to claim 27, wherein the third means is constituted by upright side portions of the base portion in which the lever means is pivotally supported on pivot pins thereof.

References Cited

UNITED STATES PATENTS

| | | | |
|---|---|---|---|
| 867,518 | 10/1907 | Mark | 24—271 |
| 978,398 | 12/1910 | Rischard | 24—19 XR |
| 1,023,639 | 4/1912 | Graham | 24—271 |
| 1,277,076 | 8/1918 | Ireland. | |
| 1,705,859 | 3/1929 | Blair. | |
| 1,942,600 | 1/1934 | Hornung | 24—19 |
| 2,768,418 | 10/1956 | Hoy et al. | 24—270 |
| 3,189,961 | 6/1965 | Heller. | |
| 3,235,925 | 2/1966 | Gerhardt et al. | |

FOREIGN PATENTS

| | | |
|---|---|---|
| 640,319 | 3/1928 | France. |
| 1,116,743 | 2/1956 | France. |
| 1,091,821 | 10/1960 | Germany. |

DONALD A. GRIFFIN, Primary Examiner

UNITED STATES PATENT OFFICE
CERTIFICATE OF CORRECTION

Patent No. 3,523,337 Dated August 11, 1970

Inventor(s) Hans Oetiker

It is certified that error appears in the above-identified patent and that said Letters Patent are hereby corrected as shown below:

Title Page

The following should be inserted:

"Foreign Application Priority Data

Switzerland June 3, 1965 No. 8067/65

Signed and sealed this 10th day of July 1973.

(SEAL)
Attest:

EDWARD M.FLETCHER,JR.
Attesting Officer

Rene Tegtmeyer
Acting Commissioner of Patents

FORM PO-1050 (10-69)

USCOMM-DC 60376-P69
☆ U.S. GOVERNMENT PRINTING OFFICE : 1969 O—366-334